(12) United States Patent
Gutsche

(10) Patent No.: US 8,491,310 B2
(45) Date of Patent: Jul. 23, 2013

(54) TEACHING AID DEVICE FOR TEACHING THE PRINCIPLES OF A SELF-CONTAINED IMPULSE GENERATOR METHOD WITHIN AN ISOLATED SYSTEM

(75) Inventor: Gottfried J. Gutsche, Mississauga (CA)

(73) Assignee: Real Automation, Mississauga, On (CA)

( * ) Notice: Subject to any disclaimer, the term of this patent is extended or adjusted under 35 U.S.C. 154(b) by 174 days.

(21) Appl. No.: 12/932,857

(22) Filed: Mar. 9, 2011

(65) Prior Publication Data

US 2012/0231433 A1    Sep. 13, 2012

(51) Int. Cl.
*G09B 23/08* (2006.01)
(52) U.S. Cl.
USPC .......................................... 434/302; 434/300
(58) Field of Classification Search
USPC ................................................ 434/300, 302
See application file for complete search history.

(56) References Cited

U.S. PATENT DOCUMENTS 3,492,881 A    2/1970    Auweele

OTHER PUBLICATIONS

U.S. Appl. No. 12/802,388, filed Sep. 30, 2010, Gutsche, Gottfried.

Kurt Giek, Engineering Furmulas, 7the Edition, U.S.A pp. L7,L10,M2,M4,M5,T9.
Halpern, Scham's 3000 solved Proplems, USA, Problem 4.15, 11, 79.
www.Wikipedia.org/Atwood_machine/, George Atwood's machine patent.

*Primary Examiner* — Gene Kim
*Assistant Examiner* — Joseph B Baldori

(57) ABSTRACT

An Education Device is presented for the classroom presentation of one single self-contained impulse, generated within an isolated system, having a substantial observable and verifiable impulse magnitude. The self-contained impulse is generated from a magnitude of spring loaded potential energy performing work on an inertial fulcrum arm structure rotatably suspended within a carriage and bearing upon it multiple inertial mass components in unequal pre-determined spacing. The work of the spring is causing a complex combined rotational and linear motion of the fulcrum arm-carriage structure involving the Hyugens-Steiner theorem. The potential energy magnitude of the spring is distributed into each inertial mass component according to each component mass moment magnitude The fulcrum arm structure is furthermore including a ballistic barrel containing a slidable impulse transfer bolt. An additional flywheel is mounted concentrically onto the final center point of gyration of the fulcrum arm structure for collapsing the acquired momentum magnitude of the fulcrum arm to zero, in a mutual reciprocal inelastic collision. The inelastic collision allows the continuation of the transfer bolt momentum to proceed within the ballistic barrel causing it to collide with a boundary of the isolated system of the device, accordingly propelling the device in a substantial observable longitudinal motion.

2 Claims, 13 Drawing Sheets

Formula 1

$$M1 * 24L = m2 * 25L + m3(25L+26L)$$

Formula 2

$$24L = \frac{Sm2 + Sm3 + 26Lm3}{M1 + m2 + m3}$$

Formula 3

$$I = M1 * 24L^2 + m2 * 25L^2 + m3 * (25L + 26L)^2$$

Formula 4

$$E_{potential} = M1 * g * 39H2 - m3 * g * 40H2 + \text{main spring energy}$$

Formula 5

$$\omega_A = \sqrt{\frac{2E_{potential}}{I}}$$

Total energy distributed: E = e1 + e2 + e3

Formula 7

$$I = mass_{Transfer\ Bolt} * (25L + 26L)^2$$

Formula 8

$$\omega_0 = 0$$

Formula 9

$$41Ke = 1/2 * I_{Bolt} * (1/2(\omega_A - \omega_0))^2$$

Formula 10

$$P = mass_{Bolt} * (25L + 26L) * (1/2(\omega_A - \omega_0))$$

TEACHING AID DEVICE FOR TEACHING THE PRINCIPLES OF A SELF-CONTAINED IMPULSE GENERATOR METHOD WITHIN AN ISOLATED SYSTEM

FIELD OF THE INVENTION

The present invention relates to teaching aid devices and an associated methods for the classroom presentation of a self-contained single impulse applied in a predetermined direction within an isolated system which is motivating the entire isolated system. The present teaching aid is using the simultaneous combined effort of rotational and longitudinal kinetic energy contained within an inertial mass structure, wherein the kinetic energy is provided selectively by potential gravitational energy or spring loaded potential energy, or both. The inherent physics principle applying to the present educational teaching aid is the consequence of the proportional relationship of centripetal accelerations $V^2/r$ to the kinetic energy content of a rotating unsymmetrical inertial mass structure within the rotational displacement distance. Additionally, the centripetal acceleration is governing the location of the natural centre point of gyration of the structure and is governing the magnitude of the tangential longitudinal vector momentum of each inertial mass component of the structure by the balance of all the centripetal forces at the common natural centre point of gyration. A further consequence of the stated proportionality of the centripetal acceleration to the potential rotational kinetic energy magnitude relationship is that the total initial root cause potential energy magnitude performing the rotational work is distributed into each individual inertial mass moment components within the structure at the ratio of each inertial mass moment magnitude to each other. The inertial mass moment is the exponential function of the radius of gyration multiplied with its inertial mass magnitude. This energy distribution process in a governing negative feedback loop wherein the governing measure is the balance of the centripetal forces. This energy distribution process is the fundamental working principle of the device. The sum of the total kinetic energy of all masses within the rotating structure is expressed in the Sum of $K.E. = \frac{1}{2} \text{mass} \times (\text{lever length} \times \text{angular speed})^2$. Accordingly, the tangential vector impulse exerted onto each inertial mass component of the rotating structure and the resultant momentum for a change in angular speed is then expressed in $P = \text{mass} \times \text{lever length} \times (\text{angular speed after the change} - \text{angular speed before the change})$. Furthermore, the moment of inertia describes the ability of an inertial mass structure to store kinetic energy while in contrast the factor of radius of gyration times the inertial mass describes the inertial mass components' ability to acquire the longitudinal tangential vector momentum magnitude of the arc motion. Subsequently, each tangential vector momentum magnitude of each mass component is a unique isomorphic quantity of each kinetic energy content and the differential sum of all tangential longitudinal vector momentum quantities is accordingly zero. This principle however is the fundamental reason that the present invention is generating a self-contained impulse. The rotating inertial mass structure used by the present invention contains one inertial mass component receiving a larger distributed kinetic energy magnitude which performs the internal self-contained impulse by separating from the structure while the remaining inertial mass components having the smaller rotational kinetic energies are stopped from delivering any further impulse with a mutual reciprocal rotational inelastic collision received from a second rotation structure in a congruent center point of gyration alignment. This inelastic collision performs again a distribution of energies according to the magnitudes of the mass moments reducing the combined collision kinetic energy to a sum of zero by heat dissipation. Accordingly, the separated inertial mass is performing a self-contained impulse within the self-contained device. Furthermore, the Huygens-Steiner theorem applies if a center point of gyration location is forced by a force couple: The vector impulse exerted onto each mass component for a given change in angular speed is depending on the relations of the forced center point of gyration to the natural center of gyration lever length and the relation of the inertial mass magnitudes to each other, which is an inter-depending exponential function. The present teaching aid device is furthermore applying to the physics principle of simultaneously separating tangential motion vector quantities of unequal masses when coupling and un-coupling from a fulcrum arm structure while the structure has a longitudinal independently floating self centering natural center-point of gyration. In this case again, the vector sum of all the centripetal forces of each rotating mass component determines the location of the natural independently floating center point of gyration on the inertial mass structure and in turn determines the energy distribution ratios in an exponential function of the gyration radius.

BACKGROUND OF THE INVENTION

The first reasonably successful invention of an inertial mass motion teaching aid was the "Atwood Machine" invented in 1784 by Rev. George Atwood. The Atwood Machine employs a pulley system for reducing the inertial mass free fall acceleration of 9.8 m/sec to an easily observable pace, easily measurable and observable by a student body. Accordingly, the present teaching aid is helping students investigate and provide help in understanding the process of generating a self-contained impulse within an isolated system using the combined effort of rotational and longitudinal mass motion. The question whether or not such a self-contained impulse could be generated within an isolated system was left substantially unanswered by Sir Isaac Newton's 1687-1726 Principia publications. The Principia postulates the Third Law of Motion: "To every action there is always an opposed equal reaction; or, the mutual actions of two bodies upon each other are always equal and directed to contrary parts." However, in chapter two, "Axioms, or Laws of Motion" Newton discusses the Third Law of Motion. In Corollary III, he discusses conservation of the quantity of motion or longitudinal momentum relative to an origin O of an inertial reference frame, in "longitudinal" reflections between two bodies. In the following Scholium with regard to pendulum experiments to verify the Third Law of Motion, Newton contrary writes at the end of Corollary HI: "From such kind of pendulum reflections sometimes arise also the circular motions of bodies about their own centers." Newton clearly states the incongruence in regards to reflection of circular motions and he writes in his own words: "But these are cases which I do not consider in what follows; and it would be too tedious to demonstrate every particular case that relates to this subject.". Then, the present teaching aid represents a continuation of Newton's volumes of labors applying the advances in the complex plane Mathematics of Gauss, Heavyside and Hertz to fully explain such motions and presents a case applicable to this subject having a large self-contained impulse and accordingly a substantially unequal reaction of an aggregate mass structure in relation to an internal mass motion action. Newton's pendulum experiments casting shadows on his third law and resulting sometimes in circular motions is most prominently successfully applied in the combined effort of rotational and longitudinal kinetic energy by the carriage mounted catapults called "Trebuchets." The carriage of the Trebuchets is not only used for projectile aiming but its main function is to improve the projectile range of the catapult. The improvement in range of this catapult was due to the simultaneous combined effort of longitudinal and rotational mass motion kinetic energy, the time spaced delayed lever action of the whip attached to the throw arm and the shifting of the centre point of gyration from the fulcrum pivot pin to its own centre point of natural gyration. The longitudinal motion component in direction of the throw of the projectile is caused by the large horizontal longitudinal inertial reluctance of the massive counter weight which is mounted on the fulcrum arm. The counter weight is reciprocally inducing a longitudinal motion in direction of the projectile throw into the carriage and reciprocally into the throw arm from the potential energy of the counter weight according the before mentioned distribution of the root cause potential energy. The "Trebuchet" was also the first device to generate such a large longitudinal force by angular acceleration of a rotational rotor mass within less than one half revolution of the rotational motion employing the previously presented proportional relationship of centripetal force to kinetic energy of a rotating mass. The longitudinal acceleration of the carriage and the throw arm tip in the direction of the throw proceeds non uniformly from a multiple of the gravitational acceleration to zero. This non-uniform rotational acceleration is caused by the difference in the location of the fulcrum arm pivot to the natural centre point of gyration of the fulcrum arm which changes the moment of inertia from a high value to a lower value according the Huygens-Steiner theorem. With fine tuning of the Trebuchet lever actions, it is possible to convert up to 65% of the potential energy of the counter weight into motion energy of the projectile depending on the transmission ratio of the whip length to the fulcrum arm length, wherein only 35% of the potential energy is lost into the recoil action. The recoil action expresses itself as a back and forth oscillation of the fulcrum arm around its final centre point of gyration. This fine tuning application demonstrates that the Trebuchet recoil action is a variable parameter unlike Newton's third law invariable equal reaction to an action. The original carriage mounted Trebuchet, however, has only one charge of potential energy per operational cycle while the present educational aid invention has two directional alternating energy charges per operating cycle. To be fully congruent with the operation of the present invention an additional mechanical pull mechanism potential energy charge must be placed on the throw arm for pre motivating an additional flywheel, independently rotatably mounted concentrically onto the exact natural final centre point of gyration of the throw arm. The flywheel is pre energized up to the exact rotational momentum magnitude, in an opposing rotational direction, as will be remaining in the counter weight-throw arm after the throw. The flywheel momentum must engage with the fulcrum arm's rotational momentum in a rotational reciprocal inelastic collision to oppose the remaining counter weight/arm momentum, present after the projectile throw, negating the recoil of the trebuchet to exact zero momentum. The initial potential energy magnitude of the counter weight minus the lift of the projectile and the throw arm up to the whip height is the kinetic energy invested into the total moment of inertia of the fulcrum arm. The projectile kinetic energy and the remaining left over kinetic energy in the fulcrum arm rotation are determined by the sum of kinetic energies of all the masses in motion according the before mentioned energy distribution ratio of the mass moments applied over the lever length cancelling the energies of the fulcrum arm and the carriage while allowing the timely independent separated projectile to retain a self-contained energy and retain its self-contained momentum. The physics principle of such an improved Trebuchet can be further placed in congruence with the nonharmonic oscillation of an oscillator pumped by alternating energy pulses having a non-resonant frequency to such an energetic extend thereby arresting the oscillations. Accordingly, the present invention is having the largest possible gradient complex plane projection. The simultaneous combined longitudinal and rotational motion of the improved Trebuchet has nonharmonic motion identical to the present educational device invention.

BRIEF SUMMARY OF THE INVENTION

It is the objective of the present invention to provide a teaching aid for teaching a mechanical method and the mathematical foundations to generate a self contained inertial propulsion impulse within an isolated, useful for the engineering of impulse generators for stabilising tall buildings, stabilizing long bridges, motivating space exploration vehicles and provide astronauts in space with pedal operated vehicles.

It is a further objective to teach and present the isomorphic symmetry of a potential energy expended and the self contained impulse magnitude exerted.

It is a further objective of the present invention to provide a device capable to produce a substantial self-contained impulse magnitude observable by a student body.

It is a further objective to provide a cost effective teaching aid for demonstrating a self-contained impulse.

It is a further objective of the present invention to provide a teaching aid for teaching a simple mechanical method to generate a self-contained impulse in absents of a gravitational field.

It is a further objective of the present invention to provide a teaching aid for graphically demonstration of the method of generating a self-contained impulse.

DETAILED DESCRIPTION OF THE PREFERRED EMBODIMENT

Figure 1A:
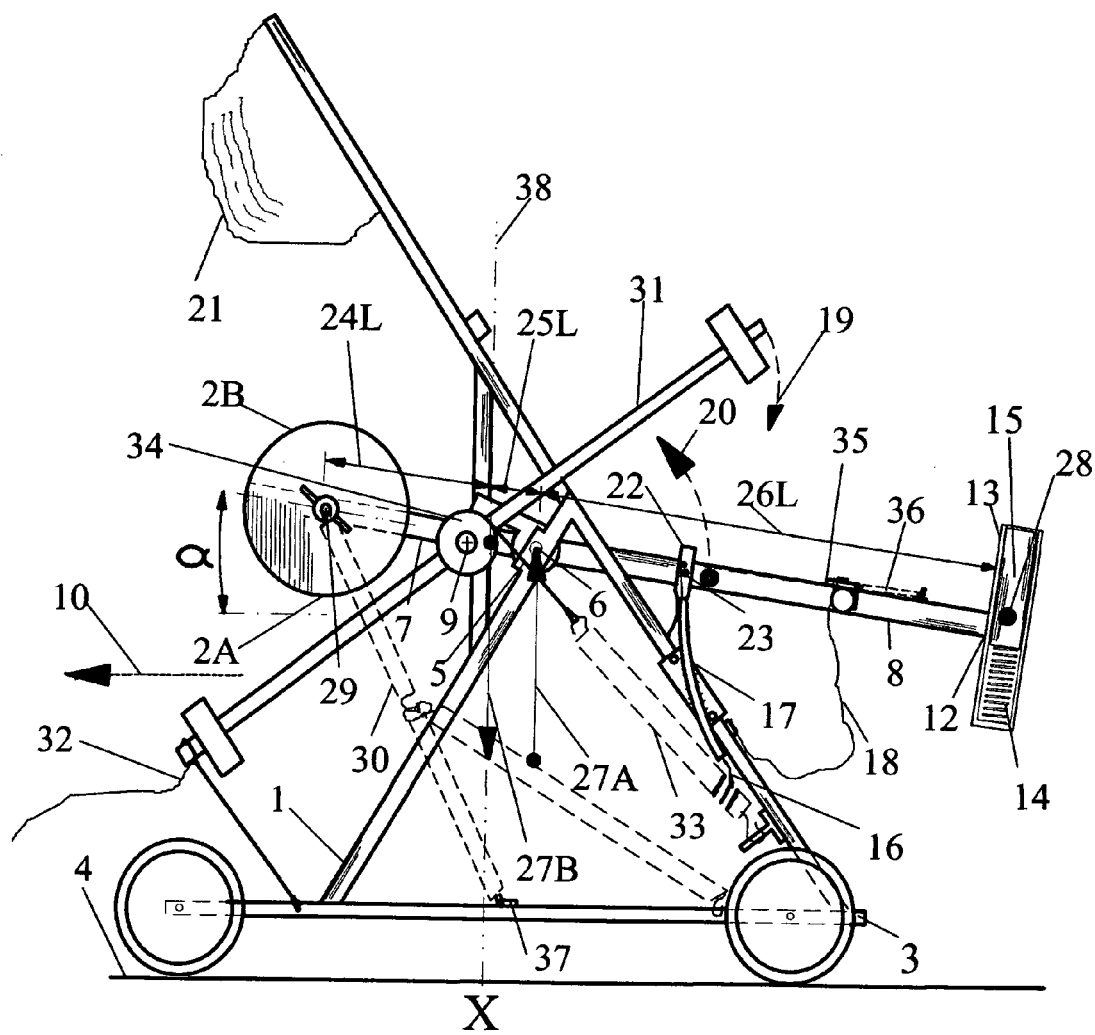
FIGS. 1A, 1B, 1C, 1D and 1E is the side view of the teaching aid while passing through the five phases of operations.

Referring to FIG. 1A. Which depicts the side view of the present Teaching Aid device in the potential energy prone position presenting the initial physics condition of the education device. The device is comprising a frame 1. The frame is sufficiently robust to support the stresses from the rotational motion of the counter weights 2A,2B. The counter weights are having preferable more than sufficient mass to balance all the masses contained on the fulcrum arm 7 and 8 structure while rotating around on the pivot pin 6. The pivot pin is the instantaneous initial center point of rotation of the fulcrum arm structure until the structure acquires any magnitude of angular speed. The inertial mass magnitudes are at the same time configured not to burden the device with unnecessary weight. The device further encompassing a carriage 3 fasted onto the frame, configured for providing longitudinal guidance and freedom of longitudinal motion on a supporting surface passage way 4 having a guidance direction 10. The supporting surface is supporting one single teaching device during its operational cycle, however, two symmetrical teaching devices operating in a mirror image configuration do not need the support of the support surface because the forces on the surface cancel to a zero sum. The frame is supporting a pivot block 5 for providing a rotational bearing surface for the pivot pin mounted onto the fulcrum arm structure. The pivot pin allows the fulcrum arm to rotate around an axis horizontal to the passage way and perpendicular to the guidance direction. The inertial mass of the fulcrum arm 7 bearing the counter weighs and connected to the throw arm 8 having an optimal configured natural final center point of gyration 9, in such a way, to produce an initial forward motion of the carriage in direction 10 through any rotation of the fulcrum arm. The throw arm tip 12 contains a spring loaded ballistic barrel chamber 13 mounted with a longitudinal orientation in the direction of the carriage guidance direction 10. The ballistic barrel contains a compression spring 14 and an impulse transfer bolt 15. The impulse transfer bolt acquires rotational kinetic energy from the fulcrum arm structure while it is contacting the compression spring 14 contained in the ballistic barrel. The compression spring 14 is helping to eject the transfer bolt from the barrel at the end of the rotational motion 20 of the fulcrum arm 8 helping to translate the centripetal forces into a velocity vector in direction of 10. The energy of the impulse transfer bolt is subsequently restrained and recovered by the impulse sail 21 for the purpose of transferring the acquired kinetic energy of the transfer bolt into the combined inertial mass of the teaching aid device representing an isolated system. The stored potential energy of the counter weight 2A,2B and the main pull spring assembly 30 is held in the potential energy prone position by the throw arm release lock 22, consisting of a flat flexible material fastened to the frame 1 and engaged with the throw arm 8 on pin 32 until released by the pull string 16. The pull string 16 is guided by the guide tube 17. The natural final center point of gyration 9 location, present on the fulcrum arm structure after the transfer bolt ejects from the ballistic barrel, contains a rotatably mounted orbiting weights arm 31 which has a rotational potential kinetic energy magnitude energized through the orbiting weights pull spring 33 and the pulley 34. The orbiting weight arm is configured to rotate at the center point of gyration employing a pivot pin and a bushing arrangement. The potential energy of the orbiting weights pull spring 33 is held in the potential energy prone position by the manual pull string 32 looped onto the end of the orbiting weighs arm. A manual pull on the string 32 triggers the orbiting weights pull spring in releasing its stored potential energy into kinetic energy of the orbiting weights and start the operational sequence of the device. The instantaneous acceleration and final angular velocity of the orbiting weights arm is presented with the arrow 19. The orbiting weights pull spring is unwinding the pulley spool 34 until the contraction of the orbiting weights pull spring tensions the trigger wire 16 to release the throw arm release lock and timely launch the rotation 20 of the fulcrum arm. The orbiting weight arm is charged with the identical rotational momentum as the fulcrum arm structure, excluding the transfer bolt kinetic energy, while spinning around the final center point of gyration 9. The instantaneous rotational acceleration 20 applied to the counter weights 2A,2B and applied to the throw arm end 12 is the differential sum of the gravitational pull of each mass on the lever length 24L, 25L and 26L and the lever pull of the main pull spring 30 on the center pin 29. According to these sums the instantaneous accelerations are a consequence of the force couple 27A and 27B applied to the pivot in 6 and the center line of gyration 38. The effective effort of the force couple 27A and 27B is depending on the progression angle a of the throw arm rotation 20 and is depending on the position of the natural center of gyration and is accordingly not an uniform acceleration. The center of gyration 38, while the transfer bolt is included in the ballistic barrel, has a steady immovable center line 38 in reference to the X mark on the supporting surface because of the preferred configured dimension of the counterweight mass. When the transfer bolt is ejected from the ballistic barrel, then the natural center point of gyration shifts to the location of point 9 on the fulcrum arm 7. The carriage in contrast has always some forward motion in direction 10 during the swing of the fulcrum arm in rotational direction 20, because of the combined rotational and descending motion of fulcrum arm 7 at the center line 28. The center of gyration only experiencing a negligible shift opposite in direction 10 during the rotational motion of the fulcrum arm throw of the transfer bolt. This shift is only depending on the magnitude of the carriage friction, this carriage friction is depleting its own distributed energy. The rotational motion of the fulcrum arm and all the inertial masses mounted upon it is subsequently arrested by the activation of the orbiting weights stopper 35 causing a inelastic collision between the orbiting weights and the stopper. The orbiting weights stopper is held in the inactive state by the stopper pull spring 36 and activated by the cam action of the stopper pull string 18 when the fulcrum arm and the throw arm reach the vertical position. This sequential action is further clarified in FIG. 1B to 1E. The stopping of the throw arm and the fulcrum arm and the counter weights without inducing any longitudinal vector component contrary to the direction 10 is caused by the orbiting weights generating an opposing force couple between point 9 and point 35. The force couple is mutual reciprocally removing all rotational kinetic energies from the inertial mass structure except the substantial energy of the transfer bolt which is continuing on its course transferring the transfer bolt kinetic energy into the impulse sail.

Figure 1B:
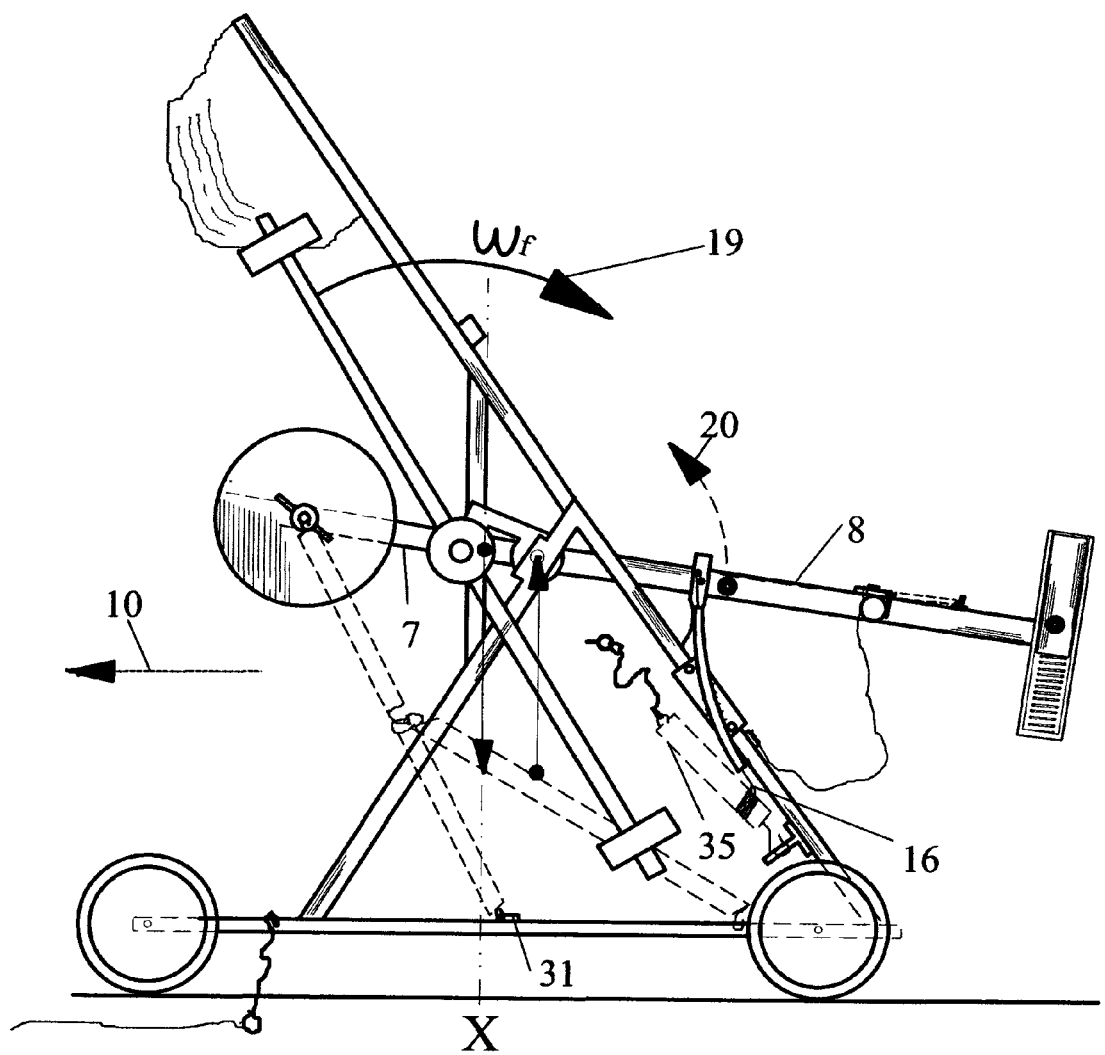

Referring to FIG. 1B, wherein the orbiting weights pull spring 30 has transferred all its potential energy into rotational kinetic energy of the orbiting weights having the angular speed 19 Wf. The pull wire 16 is tensioned to momentarily release the release lock 22 and launch the rotational motion 20 of the fulcrum arm 7 and 8 structure.

Figure 1C:
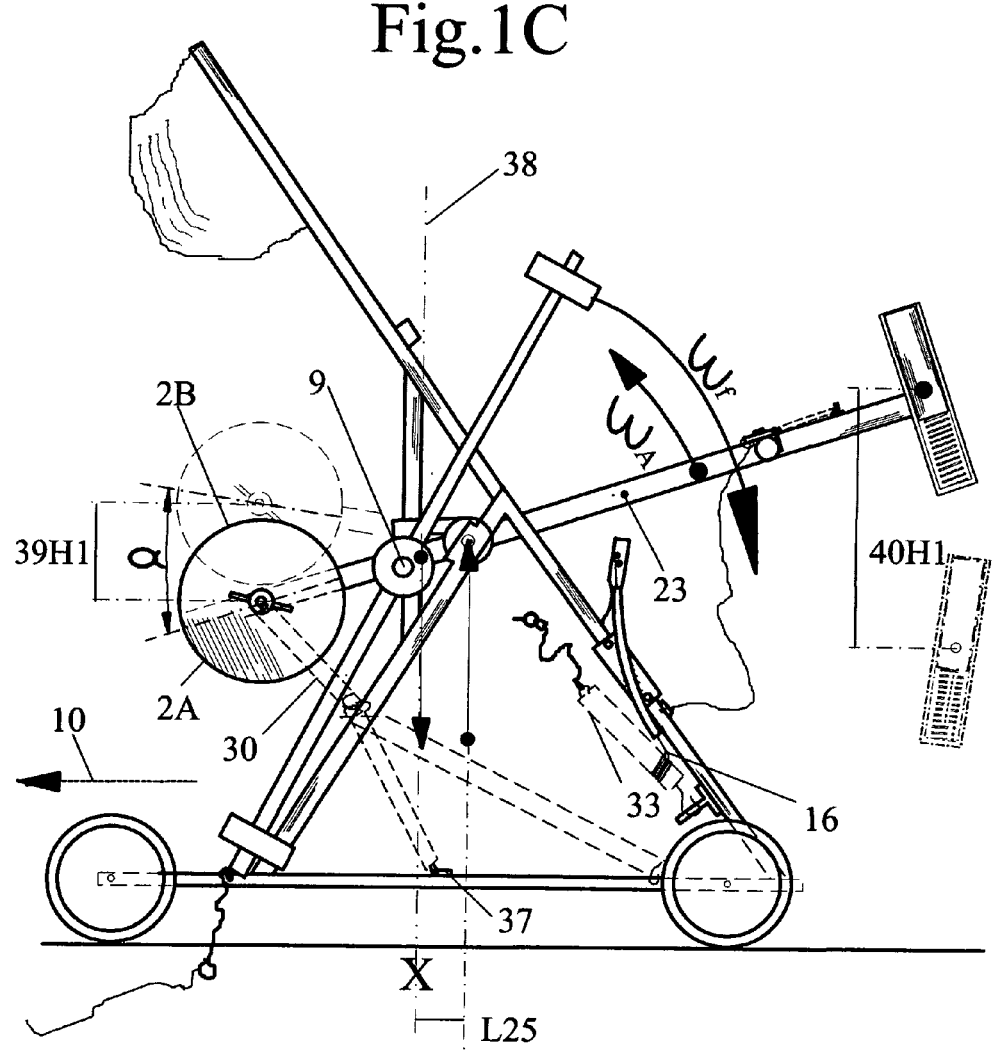

Referring now to FIG. 1C. The combined starting potential energy of the main pull spring 30 and counter weight 2A,2B is now depleted by the loss in counter weight height 39H1 and is depleted by the reduced length of the main spring 30. The depleted potential energy is converted into gain in potential energy height 40H1 of the throw arm center of gravity 28 and induced into rotational kinetic energy WA of the fulcrum arm structure. The net depleted potential energy is inducing an angular speed WA component into the throw arm around the center line of natural gyration 38. The angular speed has a variable center point of gyration shifting from the pivot pin 6 to the center line of gyration 38 and then to the final center point of gyration 9. The instantaneous acceleration WA is having a diminishing progression because the effective length 25L2 is diminishing in a progression in reference to the angle a and in reference to the position of the natural center point of gyration and the pivot pin location. The natural center point of gyration is depending on the gravitational center of the fulcrum arm inertial mass structure. This is further elaborated in FIG. 4.

Figure 1D:
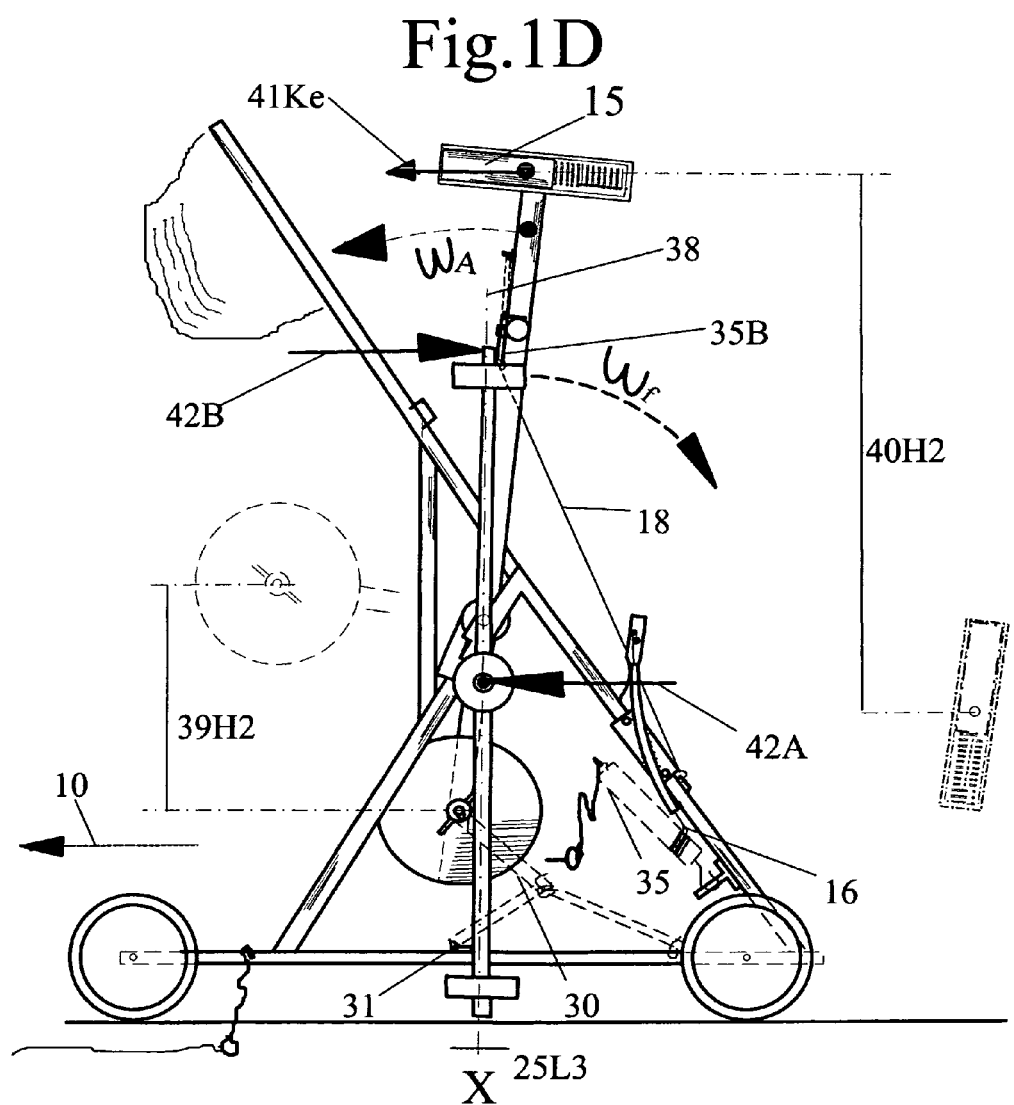

Referring now to FIG. 1D and also FIG. 1A. The starting potential energy of the counter weights 2A, 2B is furthermore diminished by the loss in height 39H2 and the potential energy of the main pull spring 30 is furthermore depleted. The depleted potential energy is invested into the angular speed WA of the throw arm spinning now around the natural center line of gyration 38 at the maximum rate and a portion of the potential energy is invested into the potential height 40H2 of the throw arm center of gravity 28. The instantaneous accelerations WA is at a minimum because the effective lever length 25L3 is at the minimum. The orbiting weights stopper activation string 18, having a cam action, is activating the orbiting weights stopper point 35B to momentarily stop the rotational motion of the orbiting weights in an inelastic collision with the fulcrum arm structure 2A, 2B, 7, 8 and 28. The depletion of the fulcrum arm structure rotational kinetic energy allows the transfer bolt kinetic energy 41Ke to proceed within the ballistic barrel at a rate of the transfer bolt mass times the length (25L+26L) times the angular speed WA. The force couple 42A coupled with force 42B, is generated from the kinetic energy Wf stored in the orbiting weights. The force couple is applying an identical force magnitude to the final center point of gyration 9 and onto the orbiting weights stopper point 35B reciprocally and contrary to the motion of the fulcrum arm structure. Accordingly, the inelastic collision arrests any recoil motion contrary to the forward direction 10 and reduce the fulcrum arm structure angular speed WA to zero and reduces the longitudinal speed component of the fulcrum arm structure to the identical carriage speed in direction 10. It is most important to note to the students of the present device that the differential angular speed progressing from the WA magnitude to zero magnitude is the root cause the self-contained momentum of the transfer bolt and it is important to include this angular speed differential it any calculation, even if one operator of the difference is reduced to zero. It is further important to note to the students that the force couple 42A and 42B is initially a forced rotation of the fulcrum arm at point 9, an offset center point of rotation in relation to point 38, wherein the Hyugens-Steiner theorem applies again. The force couple effectively induces a longitudinal momentum vector into the carriage in combined effort with the transfer bolt launch impulse resulting in a net self-contained impulse contained within the transfer bolt. The operation of the device is accordingly NOT violating the conservation of momentum principle.

Figure 1E:
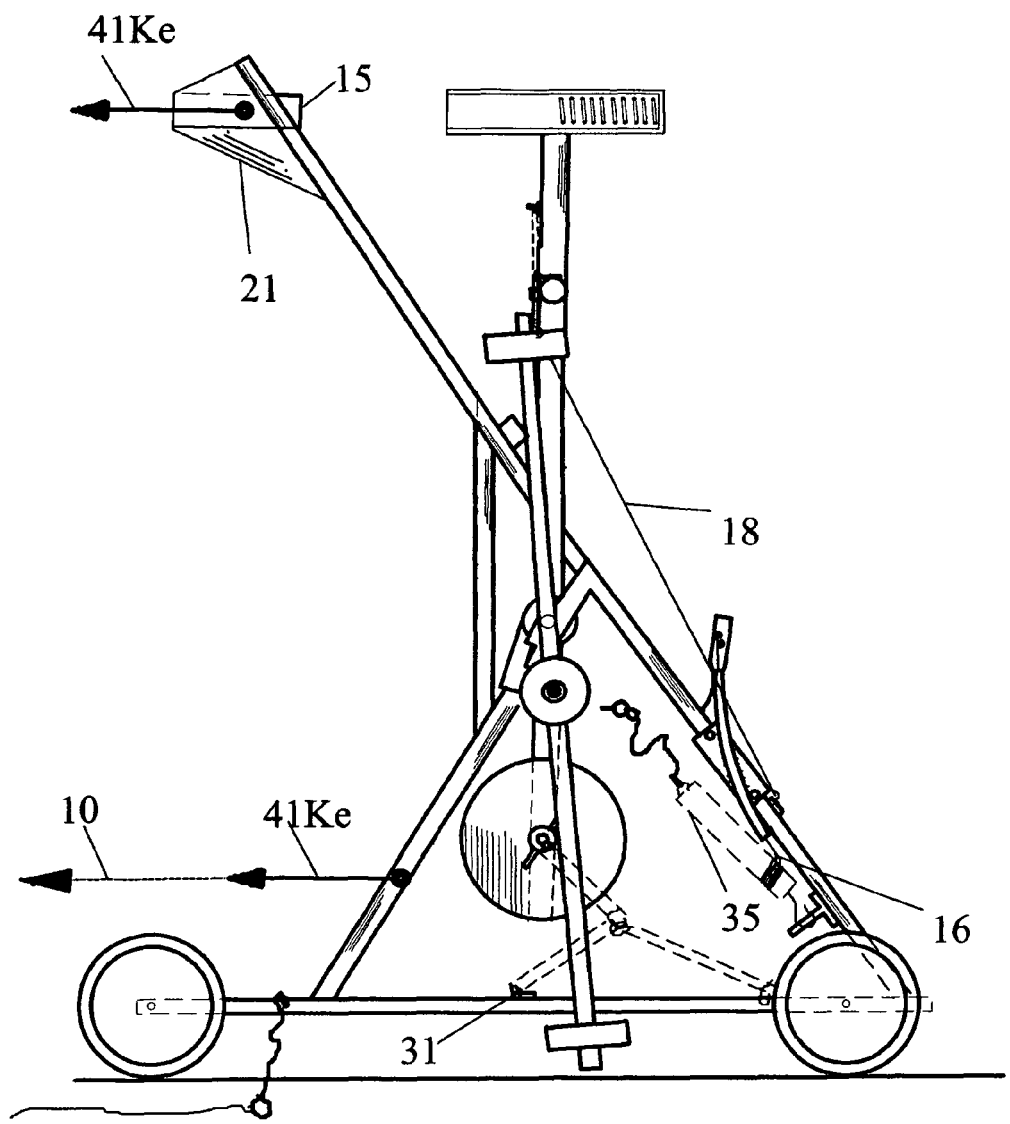

Referring now to FIG. 1E. The transfer bolt has transferred its acquired kinetic energy 41ke into the transfer sail 21 and the total inertial mass of the education device is being transported in direction 10 with the kinetic energy 41Ke traversing a distance until all kinetic energy is exhausted into frictional losses.

Figure 2:
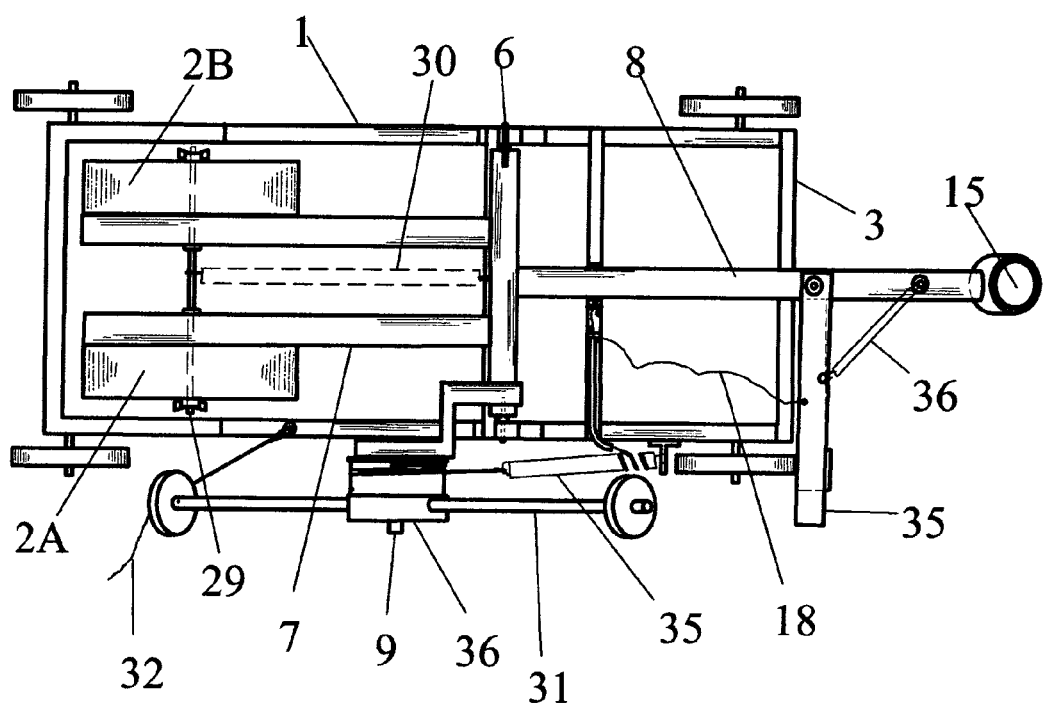
FIG. 2 is the top view of the teaching aid in the potential energy prone position.

Referring to FIG. 2 and FIG. 1A the top view of the education device is presented. The top view is depicting the frame 1, the counter weights 2A,2B, the carriage 3 and the pivot pin 6. The top view reveals the structure of the throw arm 8, the main pull spring 30 and the center pin 29. The arrangement of orbiting weights 31, the pulley 34 and the manual trigger pull string 32 for activating the orbiting weights rotational motion is shown. The orbiting weights stopper 35, the pull string 18 for activating the stopper and the return spring 36 is revealed. The impulse sail is omitted for a clear view of the components.

Figure 3:
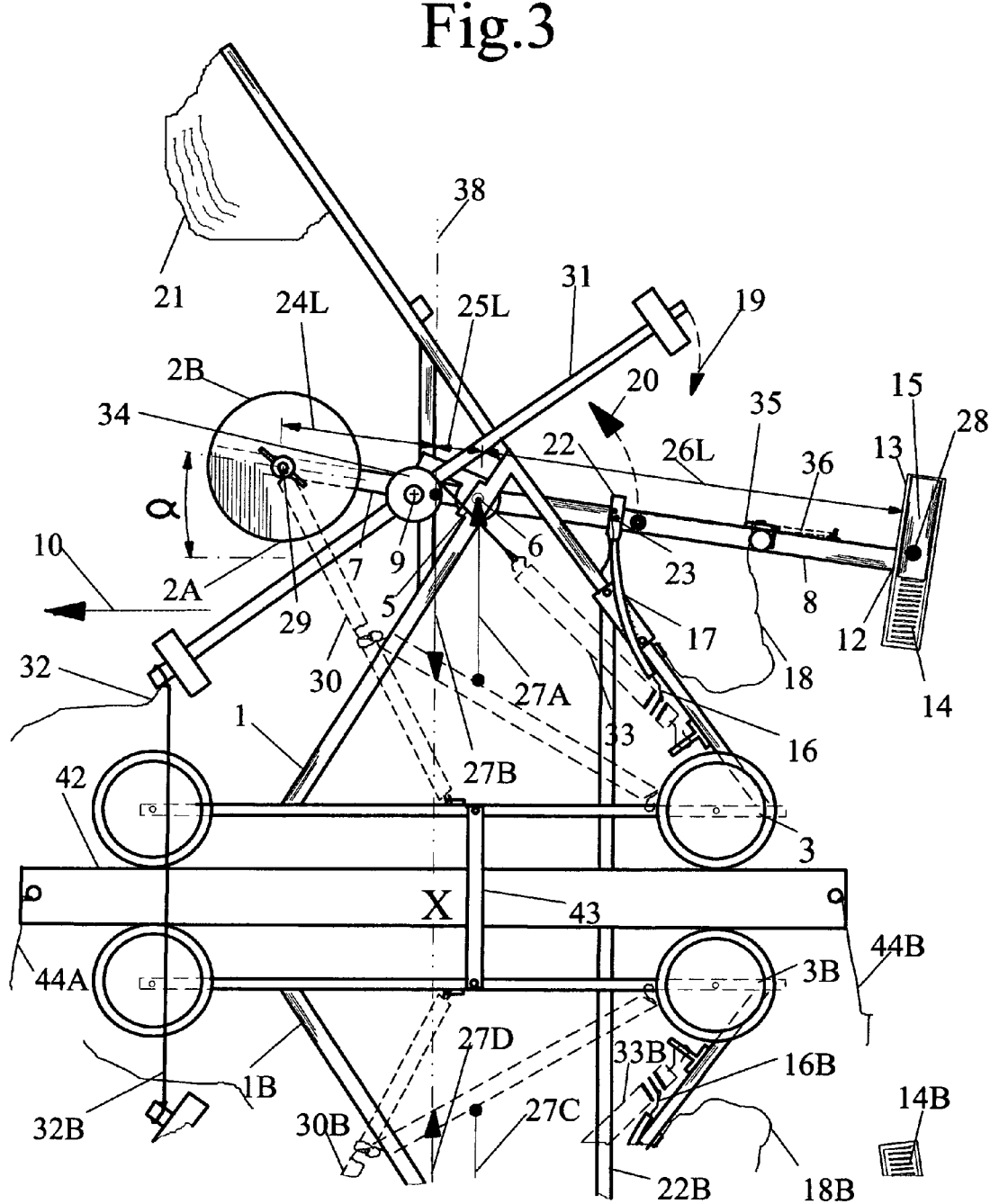
FIG. 3 is the representation of two teaching aid devices working in tandem opposing reciprocal orientation and powered by pull springs independent of gravitational pull.

Referring to FIG. 3 the top view of a dual tandem arrangement of the education device in a horizontal position is depicted. The horizontal orientation of each education device eliminates the need for the gravitational pull for the motivating energy. Each individual component in each opposing mirror image device is designated with a B suffix. For example the motivating power for each device is provided by the main pull springs 30 and 30B. Each carriage 3 and 3B is longitudinal operating on the track member 42. The carriages 3 and 3B are held in contact onto the track member by the link 43. The force couples 27A, 27B, 27C and 27D are mutually reciprocally neutralizing a sum of rotational forces of the entire system while maintaining individual rotational acceleration of each symmetrically opposing fulcrum arm structures 2A,2B, 7,8 and 28. The throw arm release lock 22 and its mirror image 22B is mutually reciprocally holding the two throw arms 8 of the tandem devices in the potential energy prone position and accordingly will launch at the exact same time instant. The orbiting weights string 32 and 32B is mutually reciprocally releasing each orbiting weights onto its operational cycle, launching the operation of each device. The operating cycle of each tandem device is following the identical progression depicted in FIG. 1A to FIG. 1E. The direction, however, is operating mutually reciprocally in opposing direction 20, thereby negating the reference provided by the passage way 4 in FIG. 1A. The suspension wires 43A and 43B are for suspending the tandem device in a flat horizontal position thereby eliminating the gravitational pull on the fulcrum arm structures.

Figure 4:
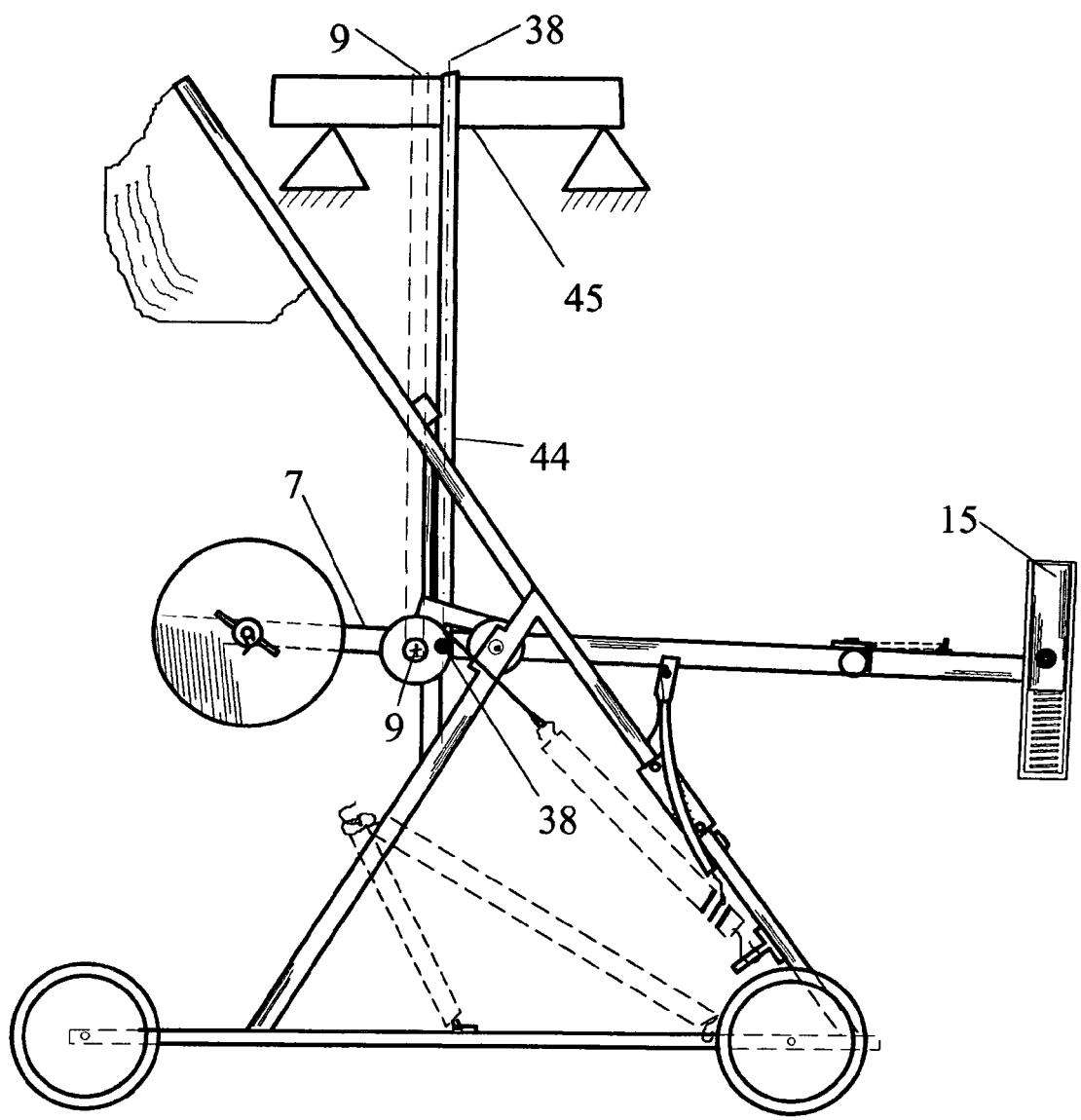
FIG. 4 is the representation of the suspension of the fulcrum arm of the teaching aid device for the purpose of acquiring the natural center point of gyration.

Referring to FIG. 4, and FIG. 1A the method of acquiring the center line of gyration 38 and the final natural center point of gyration 9 is depicted. The difference of center line of gyration 38 and the final center point of gyration 9 is the presence and the ejection of the transfer bolt 15 in the barrel 13. The mathematical method acquiring the center line of gyrations is requiring the application of calculus methods of progressive exhaustion exceeding the basic math requirements applying to the present teaching aid. The depicted method uses the equivalence of gravitational balance beam center point of gravity and the center point of gyration. The device is suspended using a strap 44 on a fixed rod 45 and the strap is shifted on the fulcrum arm 7 until gravitational balance occurs. The position of the strap 44 on the fulcrum arm 7 is then the center point of gyration. The total shift of the center of gyration on the fulcrum arm structure is from the pivot pin location 6 to the final center point of gyration 9 location.

Figure 5A:
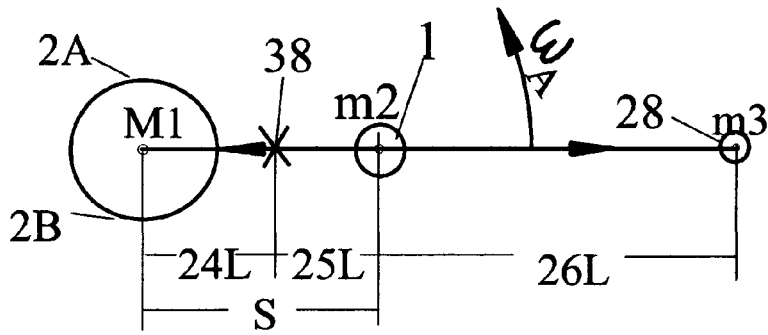
FIGS. 5A, 5B, 5C, 5D, and 5E is the step by step representation of the applicable mathematics presented to the students to teach the present invention device

Referring to FIG. 5A and also to FIG. 1D. The mathematical method of acquiring the approximate center point of gyration is presented with formula 1 which is the balance point and origin point of the centripetal forces on the fulcrum arm structure depicted in FIG. 5A. The angular velocity $WA^2$ is omitted in formula 1 as it cancels out. Given length are S and 26L. The formula 1 is solved for the length of 24L and results in formula 2. The centripetal forces $F=mass*r*WA^2$ of each mass component M1,m2,m3 on the fulcrum arm structure are in balance at the lever length 24L,25L and 26L. The mathematical method accuracy presented acquiring the lever length 24L and 25L for a give length S can be further improved by the method of exhaustion, wherein progressively smaller inertial mass components are furthermore added into the calculation. The mass moment of inertia I of the depicted structure having a turning axis at point 38 is give in formula 3. The fulcrum arm potential mechanical energy is given in formula 4. The the fulcrum arm structure peak angular velocity WA acquired in FIG. 1D is then calculated according the formula 5. The mathematical method for the final angular speed WA is using the conservation of energy and the kinetic energy for work performed principles, where all the potential energy present at the initial conditions in FIG. 1A is conserved and transferred into the mass moment of inertia I of the fulcrum arm structure, resulting in the angular speed WA. The mass moment of inertial is using the sum of the squared lever length L24 and L25 wherein each length is causing an energy feedback distribution function into each component mass. The angular speed is the square root out of the ratio of the energy E to the total mass moment of inertia I. The angular speed WA is then also the angular speed of the transfer bolt 15. The angular speed WA is accordingly an inter-depending complex function.

Figure 5B:
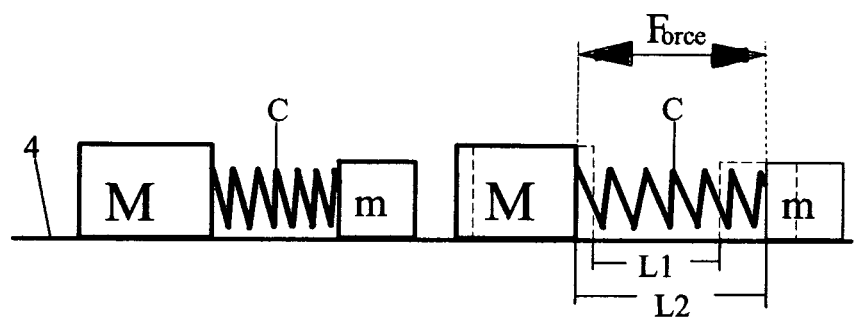

Referring to FIG. 5B and also to FIG. 1A to FIG. 1E. The physics principle of the simultaneous mutual reciprocal separation of unequal inertial masses applies to the horizontal vector direction 10 component of the complex motion of the fulcrum arm structure. The physics relationship is presented step by step culminating in the rational that the mutual separation of unequal masses is congruent with a negative feedback loop.

The stored mechanical energy E=Force*length (L2−L1)
Energy distribution of the stored mechanical energy E:
Energy, kinetic, Large, Mass/energy, kinetic, small, mass=mass, small/Mass, Large
The work magnitude performed on each mass is the consequence of the energy distribution ratio.
Work large mass/work small mass=mass small/Mass large
According to the principle of energy conservation and mutually equal applied impulse:
The total Energy E=Kinetic energy small mass+kinetic energy large Mass
Solving for the Kinetic energy of the small mass:
Kinetic energy small mass Ke=(Large Mass/small mass)*kinetic energy Large Mass
Kinetic energy small mass Ke=Total stored Energy E/((small mass/Large Mass))+1)
Accordingly the depicted energy distribution is a negative feedback function.

Figure 5C:
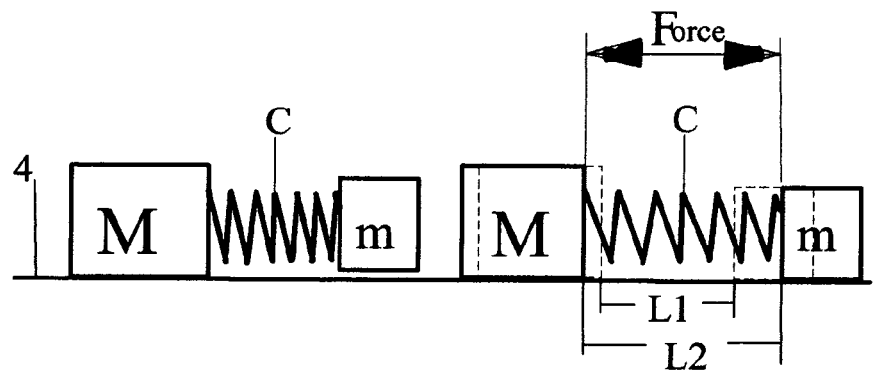
Figure 5C:
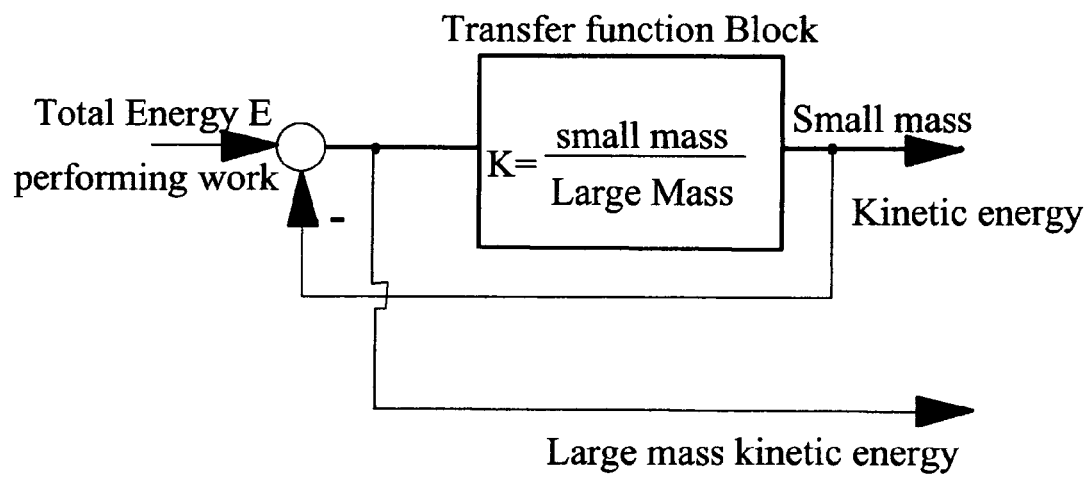

Referring to FIG. 5C. The mutual separation of unequal masses is depicted using the feedback flow diagram used in control engineering. The magnitude of the source potential energy is distributed with the Function Bloc and difference diverter. The function block has a transfer function ratio K between the input and the output K=small mass magnitude/large mass magnitude. The math in FIG. 5C proves that the mutual separation of masses in a rotational displacement is an energy flow problem.

Figure 5D:
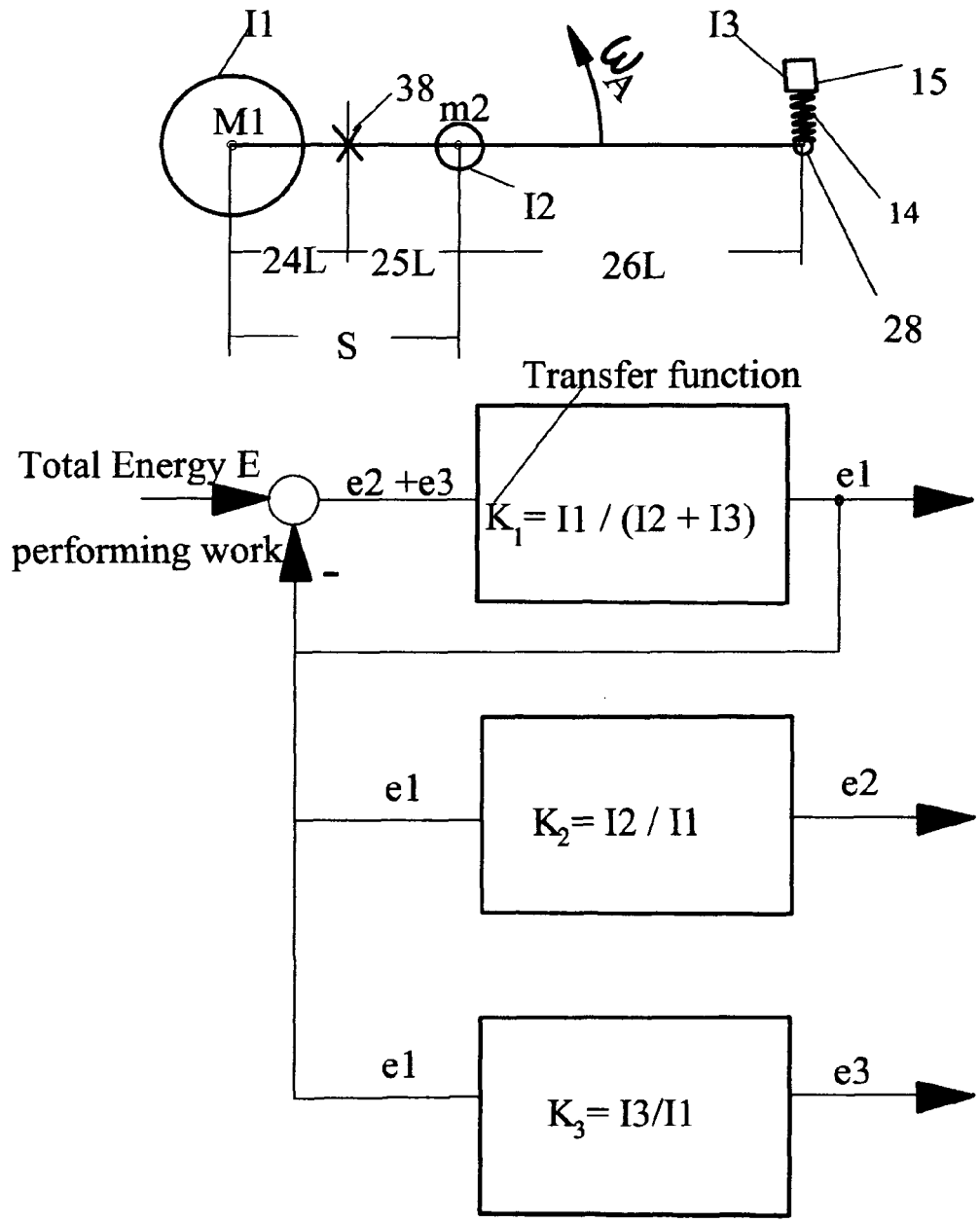

Referring to FIGS. 5D (and also 1A, 1D, 5C) wherein the source potential energy distribution principle is depicted. The presentation of control flow diagrams is used again to prove that the underlying principle is a energy flow problem. The magnitude of the source potential energy is distributed with function blocs and difference diverters. The total source potential energy is split by the energy flow into each component energy magnitude labeled energy e2 and energy e3 by subtracting energy e1 magnitude. The split of the sum of Energy e2+Energy e3 magnitude is feed into a function block having a transmission ratio K1=angular moment of inertia I1/(angular moment of inertia I2+angular moment of inertia I3). Each angular moment of inertia associated with each inertial mass component is denoted with I1,I2,I3. The energy flow magnitude leaving the function blocks is the inertial mass component energy magnitude. Each energy e1,e2 and e3 pertains to the energy of each mass component M1,m2 and m3. Accordingly, the presented control diagrams prove, the device is working with energy flow in a governing negative feedback loop wherein each component angular inertial moment of inertia I1,I2 and I3 is having a vector momentum quantity in isomorphic symmetry to each mass component kinetic energy. Each component tangential momentum vector quantity can not be obtained without applying the conservation of energy principle first. Accordingly, the principle of conservation of energy applies and is presented with formula 6. The presented control diagram presents to the students a visual representation of the physical mature of the device and an alternate method to calculate the self-contained impulse of the device.

Figure 5E:
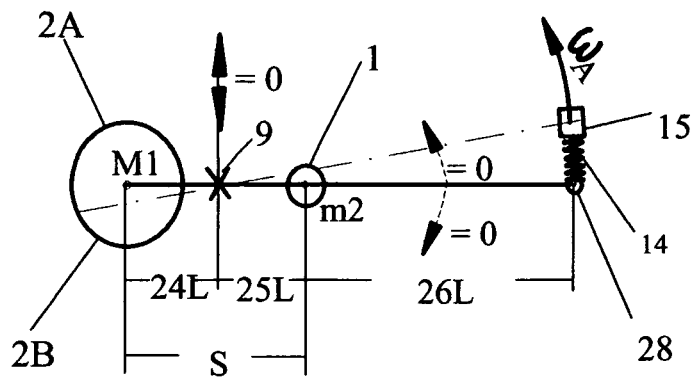

Referring to FIG. 5E (and also to FIG. 1A, FIG. 1D, FIG. 1E., FIG. 5A which depicts the fulcrum arm structure parameters after the collision between the orbiting weights arm. The before mentioned physics principle of energy distribution within the fulcrum arm structure inertial mass components under the influence of the motivating force couple 42A,42B is extrapolated to the kinetic energy 41Ke of the transfer bolt and its final angular moment of inertia magnitude I is expressed with formula 7. This new moment of inertia is the consequence of the collision depicted in FIG. 1D, where the inertial mass components M1,m2 and 28 are forced to rotate around the natural final center of point of gyration 9 because of the absents of the transfer bolt. The kinetic energy of the fulcrum arm structure, except the transfer bolt, is mutually reciprocally canceled by the inelastic collision with the orbiting weights arm in FIG. 1D having the new post collision mutual center point of gyration 9. The inelastic collision having the force couple 42A,42B is naturally self centering at point 9 and is causing the angular velocity WA content of the fulcrum arm structure inertial mass to dissipate into heat and collapse to zero while the transfer bolt is retaining its inertial velocity within the ballistic barrel. However, it is important to note to the students that the presented principles represent ideal conditions. In reality, frictional losses within the ballistic barrel caused by drag of the centripetal force within the barrel, the carriage motion friction losses and the very short time duration of the transfer from the 38 center point of gyration to the final natural center point of gyration 9 have the effect of diminishing the magnitude of the self contained impulse. The effect of the frictional losses are a separate subject not considered within the calculations. Furthermore, it is important to note that the fulcrum arm angular speed collapse is an angular speed differential, this differential must be included in any calculation because it proves that the angular speed differential makes the isomorphic conversion from kinetic energy to momentum a complex function. The speed differential does not include a zero angular speed magnitude when the ending WA angular speed after the collision is larger then zero. However, there still remains a proportional smaller magnitude of self-contained impulse. The ideal ending angular speed of WA=0 is given in formula 8. The transfer of the final kinetic 41Ke acquired by the transfer bolt is presented with formula 9 and the self-contained impulse is presented with formula 10. Accordingly, an observable self-contained impulse is generated applying to the entire inertial mass of the education device which is the consequence of the isomorphic symmetry of the transfer bolt kinetic energy to the transferred impulse of the transfer bolt and the forced collapse of the other impulse vector magnitudes of the fulcrum arm structure.

While I have shown and described a preferred embodiment of my invention, if will be apparent to those skilled in the art that many changes and modifications may be made without departing from my invention in its broader aspect. I therefore, intend the appended claims to cover all such changes and modifications as fall within the true spirit and scope of my invention.

I claim:

1. A teaching aid device for teaching the principles of generating a self-contained (41Ke) impulse in predetermined direction (10) within an isolated system comprising
- a frame (1); mounted onto
- a carriage, the carriage is configured for having freedom of longitudinal motion and having longitudinal guidance on
- a track (4); the said frame and carriage is configured to rotatably support
- a double lever fulcrum arm structure comprising two opposite mounted levers (7,8); the said double fulcrum arm comprises
- a pivot pin 6: the pivot pin is rotataby retained in
- a bearing block (5) mounted onto the said frame and is configured for guiding the fulcrum arm in a rotational motion in direction (20) having a horizontal axial orientation to the said track and perpendicular axial orientation to the said impulse direction; said first lever has the counter weights (2A,2B) attached, configured to provide gravitational balance of the said fulcrum arm structure and configured for having sufficient inertial mass to provide
- a natural center line of gyration (38) location between the said pivot pin and the said counter weights for displacing the said carriage longitudinal on the said track in the said impulse direction for any rotation of the fulcrum arm structure in the direction (20); further comprising the second lever (8) containing
- a ballistic barrel (13) mounted onto a lever tip (12) in an orientation parallel to the impulse direction (10) for guiding the sliding motion of
- a transfer bolt (15) slidably contained in the said barrel; the device furthermore comprises
- a main spring (30) configured for providing the motivating energy of the rotational motion (20) of the said fulcrum arm structure including the said transfer bolt proceeding from an initial horizontal starting position to a vertical position acquiring a kinetic energy magnitude (WA), the main spring is configured to distribute
- a stored energy potential from a
- center pin (29) onto the said first fulcrum arm structure, onto the said frame and onto said carriage; the fulcrum arm structure furthermore comprises
- an orbiting weights arm (31) rotatably disposed onto the said fulcrum arm lever (7) at a predetermined final point of gyration of the said fulcrum arm structure; the fulcrum arm structure further comprises
- an orbiting weights arm pull spring (33) configured for motivating the said orbiting weights arm to
- a pre determined rotational kinetic energy magnitude sufficient to counter the said rotational kinetic energy of the said fulcrum arm structure excluding the said acquired kinetic energy of the said transfer bolt in
- an in-elastic collision against an
- orbiting weights stopper (35) rotatably mounted onto the said second fulcrum arm (8) having
- a predetermined collision position (35B) aligning with the said orbiting weights arm; the said orbiting weight stopper is configured to be held in the retracted position with an orbiting weights return spring (36); the said orbiting weights stopper is configured to be timely positioned to collide with the said orbiting weights by a
- pull string (18) configured for having
- a cam action tensioning the pull string when the said fulcrum arm reaches the said vertical position and configured to cause the said in-elastic collision for negating all the motions of the fulcrum arm structure while allowing the said transfer bolt to slidably proceed within the said ballistic barrel for transferring the said kinetic energy into
- an impulse sail (21) mounted onto the said frame, configured for capturing the kinetic energy of the said transfer bolt in an energy conserving collision for transferring the energy as a self-contained isomorphic impulse into the entire aggregate inertial mass of the device.

2. A physics teaching aid as claimed in claim 1 further comprising
- a second teaching aid device to a total sum of two; the two devices are operating on a common track bar (42) in a opposing mirror image orientation; the two identical devices are held onto the said common track bar with
- a link (43); the simultaneous release of each said fulcrum structure is accomplished with a release lock (22,22B) mutually reciprocally holding both fulcrum arms (8 and 8B) in a potential energy prone position, for allowing the tandem teaching aid device to operate independently of the said fixed guidance track surface (4) or any gravitational forces.

* * * * *